United States Patent [19]
Baysinger

[11] 3,840,176
[45] Oct. 8, 1974

[54] HUMIDIFIER CONTROL SYSTEM

[75] Inventor: Robert L. Baysinger, St. Louis, Mo.

[73] Assignee: Emerson Electric Co., St. Louis, Mo.

[22] Filed: Nov. 4, 1971

[21] Appl. No.: 195,625

[52] U.S. Cl. ............... 236/44 R, 236/91, 200/61.06, 337/300
[51] Int. Cl. .......................................... G05d 22/02
[58] Field of Search ........... 337/300; 236/446, 44 R, 236/91; 165/21, 68 R; 200/61.06

[56] References Cited
UNITED STATES PATENTS

| | | | |
|---|---|---|---|
| 2,944,596 | 7/1960 | Sagar | 236/68 R |
| 3,454,732 | 7/1969 | Liebermann | 200/61.06 |
| 3,559,883 | 2/1971 | Buiting | 236/68 B |
| 3,666,173 | 5/1970 | Ray | 236/68 R |
| 3,685,732 | 8/1972 | Haskins et al. | 236/68 R |

*Primary Examiner*—William E. Wayner
*Attorney, Agent, or Firm*—Charles E. Markham

[57] ABSTRACT

A humidifier control system having an adjustable space humidistat automatically controlling the operation of a humidifier so as to maintain a preselected relative humidity in a space, and including means responsive to outdoor temperature operative to modify the operation of the humidifier so as to effect a progressive reduction in the relative humidity of the space as the outdoor temperature decreases through a predetermined low temperature range, the system comprising three remotely positioned units connected by electrical leads, that is, a space humidistat, an outdoor temperature sensing unit, and a transformer-relay unit.

6 Claims, 2 Drawing Figures

PATENTED OCT 8 1974
3,840,176
FIG. 1
FIG. 2
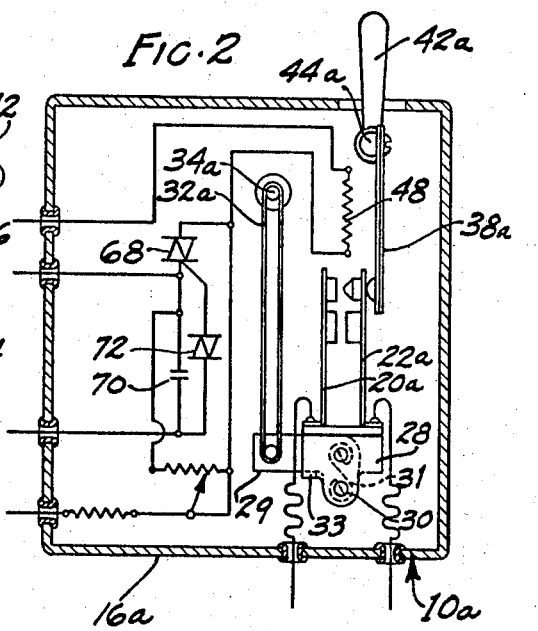
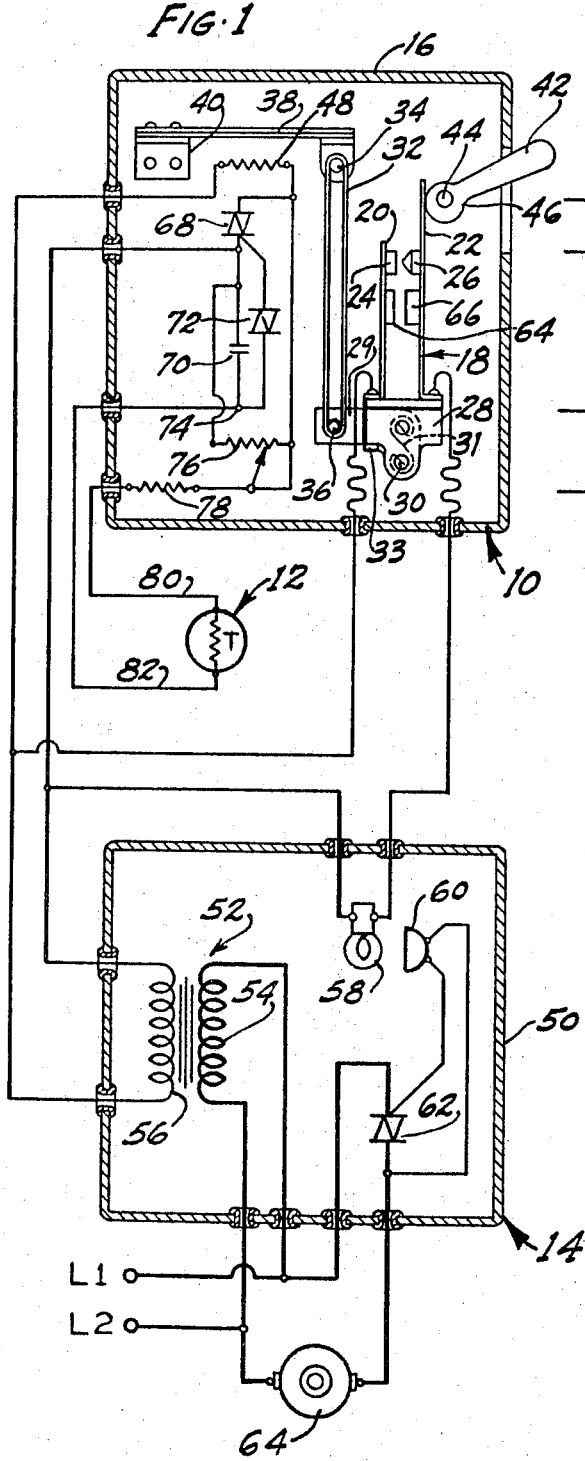

HUMIDIFIER CONTROL SYSTEM

This invention relates to devices and systems automatically controlling the operation of electrically operated humidifiers supplying moisture to the air of a space. It more particularly relates to the incorporation of means in such systems for limiting the amount of moisture supplied to the space at low outdoor temperatures and to the provision of system components which may be remotely positioned, as desired, and conveniently connected by electrical leads.

It has been found necessary in many installations to limit the relative humidity of the air in a heated space when the outdoor temperature falls substantially below freezing so as to preclude excessive condensation in the outside walls defining the space. Preferably, it is desirable to progressively limit the space humidity as the outdoor temperature decreases through a range of temperatures extending below some predetermined temperature, thereby permitting the greatest allowable space humidity without excessive condensation for any instant outdoor temperature through the temperature range.

To automatically accomplish this progressive limiting function, it is necessary to sense the outdoor temperature and variably modify the operation of the space humidistat in accordance with outdoor temperature changes through a predetermined low temperature range. This requires the positioning of an outdoor temperature responsive means more or less remotely from the indoor space humidistat and the provision of some means forming an operative connection between the two. To employ a thermostatic device positioned outdoors requires either mechanical linkage or fluid conduit means to provide this operative connection, neither of which is convenient to install.

In conventional humidifier control systems, a space humidistat comprising a switch and humidity responsive element controls a low-voltage circuit for reasons of safety, while the electrically operated humidifier usually positioned remotely from the space humidistat is operated at the higher commercial supply voltage. This requires the provision of a voltage step-down transformer and a relay means, which components are preferably positioned adjacent the humidifier and remote from the space humidistat.

In order to achieve the desired sensitivity of response and preclude drifting of the control point, it is essential to design the humidistat switch so that the force required to operate it from one position to the other in either direction is minimized. This is particularly important when employing the usual conventional and relatively economical humidity responsive actuating element constructed of an organic material which shrinks with decreasing humidity and relaxes or lengthens with increasing humidity. Stressing of the humidity responsive material as it shrinks tends to shift the control point at which the switch is operated.

It has been found necessary, however, to employ means, usually called snap action means, to accelerate the movements of the switch contacts in closing and breaking; otherwise, a prolonged period of low switch contact pressure will occur due to the slow movement imparted to the switch contacts by the humidity responsive element as it slowly responds to changes in the relative humidity of the space. During such periods, any slight vibration of the switch usually results in objectionable repeated starting and interruption of the electrically operated humidifier.

The inclusion of such means to accelerate or impart a snap action movement to the switch contacts requires the storage of energy in a resilient member during movement of the switch contacts in at least one direction and, therefore, requires a greater force to operate the switch. This obviously results in increased stressing of the humidity responsive element. To provide a snap action movement of the contacts which completely eliminates any softness or walking of the contacts or any period of insufficient contact pressure requires the storage of considerable energy, and results in a considerable increase in the switch operating force and in the stressing of the humidity responsive element and therefore poses a problem.

Applicant has found that a switch including snap action means capable of reducing the period of low contact pressure to a brief interval, while increasing the switch operating force only slightly when combined with a relay including means to briefly delay its operation upon closing or opening of the switch contacts, solves this problem.

An object of the invention is to provide a generally new and improved humidifier control system comprising a space humidistat unit, an outdoor temperature responsive unit, and a transformer-relay unit, which units are adapted to be mounted in position remote from each other and are operatively connected only by electrical leads.

A further object is to provide a humidifier control system in which an adjustable space humidistat controls operation of a humidifier in accordance with requirements to maintain a preselected relative humidity in a space and in which means responsive to outdoor temperature is operative to effect a reduction in the relative humidity of the space below that preselected when the outdoor temperature falls below a predetermined point.

A further object is to provide a humidifier control system including a space humidistat comprising a switch, a humidity responsive element operatively connected to the switch, and a manual adjusting means for selecting the control point at which the humidity responsive element effects closure of the switch upon decreasing relative humidity in the space, the system further including means responsive to outdoor temperature and operative to progressively lower the control point below that preselected as the outdoor temperature decreases between two predetermined low outdoor temperatures and to subsequently progressively raise the control point to that preselected as the outdoor temperature increases to the higher of the two predetermined temperatures.

Further objects and advantages will appear from the following description of a preferred form of the invention when read in connection with the accompanying drawing.

In the drawing:

FIG. 1 is a schematic view of a humidifier control system constructed in accordance with the present invention; and FIG. 2 is a schematic view of an alternate arrangement of the means for modifying the operation of the humidistat in accordance with outdoor temperature changes.

Referring to the drawing in more detail, the system shown in FIG. 1 comprises a space humidistat generally indicated at 10, an outdoor temperature responsive unit generally indicated at 12 consisting of an encapsulated thermistor T, and a transformer-relay unit generally indicated at 14.

The space humidistat 10 is adapted to be mounted in the enclosed space in which the relative humidity is to be controlled. Humidistat 10 comprises a casing 16 which houses a switch 18 having spaced flexible blades 20–22. Mounted on the free ends of the blades are contacted 24–26, respectively. The flexible blades 20–22 are fixed at their lower ends to a rocking member 28, and when in their unstressed position, as shown, space the contacts 24–26 in open position. The blade 20 is made somewhat thicker and less flexible than blade 22 for a reason to be explained. The rocking member 28 is pivotally mounted on a pivot pin 30 fixed in the wall of casing 16. The casing further houses a humidity responsive element 32 which, preferably, is a strip of nylon formed as a closed loop extending over an upper pin 34 and a lower pin 36.

The lower pin 36 is fixed in a second rocking member 29 partially underlying the rocking member 28 and also pivoted on pivot pin 30. Relative movement of rocking members 28 and 29 in one direction is restrained by a spring 31 and is prevented in the opposite direction by a lip 33 formed on member 28. The upper pin 34 is fixed to the free end of a bimetal strip 38. The other end of bimetal strip 38 is fixed to the wall casing 16 by a bracket 40. Decreasing humidity causes the shrinking of element 32 and effects the clockwise rotation of rocking members 28 and 29. While the bimetal strip 38 is inherently flexible, it is nevertheless considerably stiffer than either of the blades 20–22.

A manual adjusting lever 42 pivotally mounted on a pivot pin 44 fixed in the casing wall has a cam surface 46 which engages the free end of switch blade 22 so that clockwise rotation of rocking member 28 causes switch blade 22 to flex and contact 26 to approach contact 24. Clockwise rotation of adjusting lever 42 tends to rotate switch member 28 counterclockwise, but this rotation is resisted by element 32 so that tension in element 32 is increased. The adjusting lever 42 includes some conventional means (not shown) to releasably hold it in any adjusted position.

Mounted in the casing 16 adjacent the bimetal strip 38 is an electrical resistance heater 48 arranged to heat the bimetal strip and effect its warping. Bimetal strip 38 is arranged with its high expansion strip on the lower side thereof so that when it is heated the free end thereof warps upward thereby increasing the tension in element 32 and tending to rotate switch 18 in a clockwise direction toward a closed position.

The transformer-relay unit, generally indicated at 14, is adapted to be mounted adjacent the humidifier and remote from the humidistat 10 and outdoor temperature responsive unit 12. Unit 14 comprises a casing 50 which houses a transformer 52 having a primary winding 54 and a secondary winding 56. Casing 50 further houses relay means comprising a filament lamp 58, a light sensitive cell 60, and a normal non-conductive, bi-directional, solid state switch (Triac) 62, the conduction of which is controlled by a gating circuit including the cell 60. The light sensitive cell 60, connected between the control electrode of Triac 62 and the anode side thereof, has a very high resistance to current flow in the ambient light within casing 50, but when the filament of lamp 58 mounted adjacent thereto is sufficiently heated, the cell 60 becomes sufficiently conductive to permit the gating and conduction of Triac 62. The Triac 62 is connected across power source terminals $L_1$–$L_2$ in series with an electric motor 63 which drives a humidifier (not shown). The transformer primary winding 54 is also connected across power source terminals $L_1$–$L_2$ in parallel with motor 64 and Triac 62.

The space humidistat switch 18 and filament lamp 58 are series connected across the transformer secondary winding 56 so that when switch 18 is closed lamp 58 is lighted. In order to accelerate the movement of humidistat switch contacts 24–26 toward and away from each other, a small permanent magnet 64 and a cooperating armature 66 are mounted, respectively, on the free ends of switch blades 20–22. In order to minimize the force required to operate the switch, the attractive force of magnet 64 is just sufficient to effect an acceleration of the switch contacts which will substantially eliminate or at least reduce to a very short time interval the relatively prolonged period of unpredictable contact pressure which would otherwise occur if the contacts "walked" slowly together or apart at the rate at which the element 32 responds to changes in humidity.

The electrical resistance heater 48 which heats the bimetal strip 38 is connected across the transformer secondary winding 56 in series with a Triac 68. Conduction of Triac 68 is controlled by a gating circuit comprising the thermistor T of the outdoor temperature responsive unit 12, a capacitor 70 series connected across Triac 68, and a bi-directional, solid state, voltage responsive triggering switch 72 (Diac) connected between a circuit point 74 and the control electrode of Triac 68. The control circuit for Triac 68 further includes a variable resistor 76 connected across the Triac 68 in parallel with thermistor T and capacitor 70, thereby to permit calibration of the gating circuit with relation to outdoor temperature. A fixed resistor 78 connected in series with thermistor T and capacitor 70 limits current flow through thermistor T. Thermistor T is preferably enclosed in a protective capsule or casing and positioned outdoors of the space and remote from the humidistat and transformer relay units, the circuit leads 80-82 permitting convenient outdoor positioning of unit 12.

FORM SHOWN IN FIG. 2

In the form of the invention shown in FIG. 2, a bimetal strip 38a is fixed at one end to a manual adjusting lever 42a. The level 42a is pivotally mounted on a pivot 44a fixed in the casing wall. The free end of bimetal strip 38a is arranged to engage the free end of switch blade 22a. The humidity responsive element 32a is looped over an upper pin 34a fixed in the casing wall and over the lower pin 36 fixed in rocking member 29. As lever 42a is rotated clockwise, the free end of bimetal strip 38a engages the switch blade 22a causing the rocking members 28 and 29 to rotate counterclockwise, thereby increasing the tension in element 32a. The lever 42a is also provided with conventional friction or detent means (not shown) releasably holding it in any adjusted position.

The bimetal strip 38a is arranged with its high expansion strip on the right-hand side, and when it is heated by the electrical resistance heater 48 positioned adjacent thereto, the lower free end thereof warps to the left, also tending to increase the tension in element 32 and move the switch contacts closer together. The control circuit for the resistance heater in FIG. 2 is identical to that shown in FIG. 1.

OPERATION

The humidistat switch 18 is shown in an open position in FIG. 1, which position it assumes when the relative humidity of the space is equal to or greater than that preselected by the positioning of the adjusting lever 42. When the relative humidity of the space decreases below this point, contraction of element 32 causes rocking elements 29 and 28 to rotate clockwise, thereby flexing the switch blade 22 and storing energy therein and moving contact 26 toward contact 24 and armature 66 toward magnet 64. As contraction of element 32 progresses, the magnet 64 reaches a proximity with its armature 66 where the magnetic force becomes sufficient to move the contacts closed at a relatively rapid rate. The action of the magnet will flex the switch blade 20 toward blade 22. The blade 20 while being slightly stiffer than spring 22 will be flexed because at this time it is unstressed, while blade 22 is substantially stressed.

Closing of contacts 24-26 completes the circuit connecting the lamp 58 across the secondary winding of transformer 56 and the lamp filament is heated. When the lamp filament is sufficiently heated so as to radiate energy at a frequency which will effect a sufficient drop in resistance of cell 60 to cause the gating and conduction of Triac 62, the humidifier motor will be energized and moisture will be supplied to the space. When the relative humidity of the space rises to the preselected value due to moisture supplied by the humidifier, the element 32 will begin to relax. As relaxation of the element progresses with increasing humidity, the force of previously stressed switch blade 22 tends to rotate members 28 and 29 counterclockwise, and when relaxation of the element reaches the point at which the stored force in blade 22 overcomes the attractive force of magnet 64, there will be an abrupt breakaway of the contacts to an open position.

It will be understood that because it is essential to minimize the operating force of the switch the attractive force of magnet 64 for its armature 66 as contacts 24-26 approach a closed position is made quite small, so that the stress required to be stored in blade 22 which will enable it to break this magnetic attraction upon relaxation of element 32 may also be quite small. The blade 20 is made somewhat stiffer than blade 22 in order to increase its resistance to flexing under the force of attraction of magnet 64 as the switch contacts are closing. While such increase in resistance to flexing reduces the contact closing speed and contact pressure provided by the magnet 64, it is, nevertheless, essential to store at least sufficient force in blade 20 to provide the reacting force required to break the magnetic attraction upon a subsequent opening of the contacts. It will be seen from the foregoing that the values and relationship of the strength of magnet 64 and the flexibility of blades 20-22 become quite critical, and that contact speed is reduced in the described arrangement as the switch operating force is minimized.

A brief delay between the closure of contacts 24-25 and conduction of Triac 62 is, however, provided and serves to obviate the effects of any brief period of inconstant or insufficient contact pressure resulting from lack of contact speed. There is, of course, the inherent delay due to the interval ordinarily required to heat the filament of lamp 58 to a temperature necessary to effect a sufficient reduction in the resistance of cell 60 to fire the Triac 62. This interval is, however, increased under any conditions of inconstant or insufficient contact between the switch contacts, so that it may be considerable under such conditions. The cell 60 is a commercially available device having a peak sensitivity in blue light and a very low sensitivity to infra-red frequency, which requires the lamp to be substantially fully heated to effect the required reduction in its resistance.

When the outdoor temperature is 20° Fahrenheit or above, the conduction through thermistor T is at its maximum and is sufficient to effect the conduction of Triac 68 through the greater part of each half cycle of the power supply. This level of conduction effects a maximum energization of resistance heater 48 and causes a maximum heating of bimetal strip 38 and the maximum tension upon element 32 which can be applied by the bimetal strip 38. Above an outdoor temperature of 20° Fahrenheit, the effect of bimetal strip 38 will therefore be constant and the control point, that is, the relative humidity of the space at which the switch contacts will close, is determined only by the position of adjustment lever 42.

As the outdoor temperature falls below 20° Fahrenheit, the resistance of thermistor T increases, thereby requiring more time each half cycle for capacitor 70 to charge to a voltage which will break down Diac 72 and fire the Triac 68. The Triac 68 will therefore be fired progressively later in each half cycle as the outdoor temperature drops. As a result of this the output of resistance heater 48 will be progressively reduced, and the control point or the relative humidity at which the switch contacts close will be progressively lowered. Cooling of the bimetal strip relaxes the tension on element 32, and therefore requires a lower relative humidity and greater contraction of the element to effect closure of the contacts. The resistance of thermistor T increases until some predetermined low temperature is reached, preferably −20° Fahrenheit, at which insufficient conduction through thermistor T will occur to effect conduction of Triac 68. Below this temperature no further downward adjustment of the control point is effected by the outdoor sensing means 12.

In the modification shown in FIG. 2, the lower free end of the bimetal strip 38a warps to the left when heated, thereby tending to rotate the switch counterclockwise and increase the tension on element 32a. This raise the control point as in the arrangement shown in FIG. 1. The progressive reduction in heating of the bimetal 38a as the outdoor temperature drops between 20° Fahrenheit and −20° Fahrenheit is accomplished in the same manner as shown and described in FIG. 1.

I claim:

1. In a humidifier control system, an a.c. power source, circuit connections including a signal controlled solid state switch connecting an electrically operated humidifier across said power source, a voltage step-down transformer having a primary winding connected across said power source and having a secondary winding forming the power source of a low voltage circuit which includes in series arrangement therewith a humidity responsive switch and a filament lamp, and gating means for said solid state switch including a light sensitive cell looking at said filament lamp and operative to effect conduction of said switch when said lamp filament becomes sufficiently heated upon closure of said humidity responsive switch, means responsive to outdoor temperature and operative in response to decreasing temperature below a predetermined outdoor temperature to modify the operation of said humidity responsive switching means in a manner to progressively reduce the humidity in a space, said means comprising a heat responsive actuator operatively connected to said humidity responsive switch, an electrical resistance heater operative to heat said actuator, and a second signal controlled solid state switch series connected across said transformer secondary winding, and temperature variable gating means including a thermistor positioned outdoors for controlling conduction of said second solid state switch thereby to control current flow through said resistance heater.

2. The humidifier control system claimed in claim 1 in which said gating means for said second solid state switch is operative to fire said switch progressively later during each conductive half cycle thereof as the outdoor temperature drops, and said gating means further including a capacitor series connected with said thermistor across said solid state switch, and a voltage breakdown switch connected to the control electrode of said switch and to a point between said thermistor and said capacitor.

3. The humidifier control system claimed in claim 1 which comprises three units adapted to be positioned remote from each other and connected only by electrical leads: a first space humidistat unit comprising a casing housing said humidity responsive switching means, said heat responsive actuator, said resistance heater and the control circuit therefor except said thermistor; a second outdoor temperature sensing unit comprising a thermistor and a casing housing it; and a third transformer relay unit comprising a casing housing said voltage stepdown transformer, said solid state switching means, said filament lamp, and said light sensitive cell.

4. In a space humidistat, a switch comprising a pivoted member, a pair of resilient switch blades connected at one end to said member and extending therefrom in spaced relationship to free ends, a contact carried by each of said blades and normally in spaced relationship, a humidity responsive element connected at one end to said pivoted member and fixed at its other end and responsive to decreasing relative humidity to contract and rotate said member in one direction, abutment means engaging one of said blades near its free end and opposing rotation of said member in said one direction thereby causing flexing of said blade and the movement of the contact thereon toward the other contact, manual means for adjustably positioning said abutment means thereby to vary the control point at which said contacts will be closed in response to decreasing humidity, and means including a bimetal strip forming an operative connection between said manual means and said abutment means operative when variably heated to vary the position of said abutment means thereby to vary said control point, an electrical resistance heater operative to heat said bimetal strip, an electrical circuit for energizing said heater comprising said heater, a power source, and a signal controlled solid state switch, and gating means for said switch including a thermistor adapted to be positioned so as to be responsive to outdoor temperature and operative to effect the conduction angle of said switch so as to progressively reduce the current flow through said heater as the outdoor temperature drops.

5. In a space humidistat, a switch comprising a pivoted member, a pair of resilient switch blades connected at one end to said member and extending therefrom in spaced relationship to free ends, a contact carried by each of said blades and normally in spaced relationship, a humidity responsive element connected at one end to said pivoted member and at its other end to the free end of a bimetal strip which has its other end fixed, the element being responsive to decreasing relative humidity, to contract and rotate said member in one direction. abutment means engaging one of said blades near its free end and opposing rotation of said member in said one direction thereby causing flexing of said blade and moving the contact thereon toward the other contact, manual means for adjusting said abutment means whereby the control point at which said contacts will close upon decreasing relative humidity may be varied, and means for automatically varying the control point in accordance with outdoor temperature comprising an electrical resistance heater operative to variably heat said bimetal strip thereby to vary the tension in said humidity responsive element, electrical circuit means comprising said resistance heater, a power source, and signal controlled solid state switching means, and gating means for said switching means including a thermistor responsive to outdoor temperature and operative to reduce the conduction angle of said switching means as the outdoor temperature decreases.

6. The space humidistat claimed in claim 5 in which said thermistor is operative to effect maximum conduction of said solid state switch at all temperatures above a predetermined outdoor temperature and to effect a progressive reduction in the conduction thereof to zero conduction as the outdoor temperature decreases therefrom to a lower predetermined outdoor temperature.

* * * * *